US011275176B2

(12) United States Patent
Dielacher et al.

(10) Patent No.: US 11,275,176 B2
(45) Date of Patent: Mar. 15, 2022

(54) PHASE EMULATOR FOR A TIME-OF-FLIGHT (TOF) DEVICE

(71) Applicant: Infineon Technologies AG, Neubiberg (DE)

(72) Inventors: Markus Dielacher, Graz (AT); Martin Flatscher, Graz (AT); Stefan Gansinger, Graz (AT); Robert Lobnik, Bad Eisenkappel (AT)

(73) Assignee: Infineon Technologies AG, Neubiberg (DE)

( * ) Notice: Subject to any disclaimer, the term of this patent is extended or adjusted under 35 U.S.C. 154(b) by 800 days.

(21) Appl. No.: 16/182,286

(22) Filed: Nov. 6, 2018

(65) Prior Publication Data

US 2020/0142063 A1 May 7, 2020

(51) Int. Cl.
*G01S 17/26* (2020.01)
*G01S 7/484* (2006.01)
(Continued)

(52) U.S. Cl.
CPC .......... *G01S 17/26* (2020.01); *G01S 7/484* (2013.01); *G01S 7/497* (2013.01); *G01S 17/89* (2013.01)

(58) Field of Classification Search
CPC .......... G01S 17/26; G01S 7/484; G01S 7/497; G01S 17/89
See application file for complete search history.

(56) References Cited

U.S. PATENT DOCUMENTS

2012/0236290 A1* 9/2012 Eisele ............. G01C 25/00
356/6
2015/0103330 A1* 4/2015 Wilks ............. G01S 7/4915
356/5.01
(Continued)

FOREIGN PATENT DOCUMENTS

DE 102016219519 A1 * 5/2017 ............. G01S 7/493
DE 102016219519 A1 5/2017
(Continued)

OTHER PUBLICATIONS

Translation for FOR DE102016219519A1 (Year: 2017).*
Extended European Search Report for Application No. EP19207229.6, dated Mar. 17, 2020, 8 pages.

*Primary Examiner* — Elizabeth H Rosen
*Assistant Examiner* — Tiffany N Tucker
(74) *Attorney, Agent, or Firm* — Harrity & Harrity, LLP (57) ABSTRACT

An example time-of-flight device may include an emitter component configured to emit a plurality of modulated signals toward an object during a transmission window, wherein the plurality of modulated signals emitted during the transmission window are to be used to determine a single distance measurement associated with the object and the time-of-flight device. The time-of-flight device may include a control component configured to cause, via the emitter component, emission of a first modulated signal and emission of a second modulated signal, of the plurality of modulated signals, toward the object, wherein the first modulated signal is emitted during a first portion of the transmission window and has a first phase of a plurality of preconfigured phases, and wherein the second modulated signal is emitted during a second portion of the transmission window and has a second phase of the plurality of preconfigured phases; and cause, using the emission of the first modulated signal and the emission of the second modulated (Continued)

signal during the transmission window, an emulation of a transmission of a measurement signal that has a measurement phase defined based on the first phase and the second phase, wherein the measurement phase is different from the first phase and the second phase.

20 Claims, 6 Drawing Sheets

(51) Int. Cl.
*G01S 7/497* (2006.01)
*G01S 17/89* (2020.01)

(56) References Cited

U.S. PATENT DOCUMENTS

2016/0316112 A1* 10/2016 Tadano ............... G01S 17/32
2018/0052231 A1*  2/2018 Cho .................. G01S 7/4918

FOREIGN PATENT DOCUMENTS

EP     3287807 A1 *  2/2018  ............ G01S 17/89
EP     3287807 A1     2/2018

* cited by examiner

PHASE EMULATOR FOR A TIME-OF-FLIGHT (TOF) DEVICE

BACKGROUND

A time-of-flight (ToF) based imaging system may determine a distance to an object based on an amount of time needed for a modulated optical signal, emitted by an emission source of the imaging system, to be reflected back to an array of photosensitive pixels of the imaging system. The amount of time can be identified based on a difference between a phase of the modulated optical signal when emitted by the emission source and a phase of the modulated optical signal when received by the array of photosensitive pixels.

SUMMARY

According to some implementations, a time-of-flight (ToF) device may include an emitter component configured to emit a plurality of modulated signals toward an object during a transmission window, wherein the plurality of modulated signals emitted during the transmission window are to be used to determine a single distance measurement associated with the object and the time-of-flight device; and a control component configured to cause, via the emitter component, emission of a first modulated signal and emission of a second modulated signal, of the plurality of modulated signals, toward the object, wherein the first modulated signal is emitted during a first portion of the transmission window and has a first phase of a plurality of preconfigured phases, and wherein the second modulated signal is emitted during a second portion of the transmission window and has a second phase of the plurality of preconfigured phases; and cause, using the emission of the first modulated signal and the emission of the second modulated signal during the transmission window, an emulation of a transmission of a measurement signal that has a measurement phase defined based on the first phase and the second phase, wherein the measurement phase is different from the first phase and the second phase.

According to some implementations an imaging system may include a modulation component to provide a plurality of modulation signals, wherein the modulation component is to generate the plurality of modulation signals to include phase shifts using a threshold number of preconfigured phase shift outputs; an emitter component to emit a plurality of modulated signals toward an object during a transmission window according to the plurality of modulation signals; a sensor component to detect a plurality of reflected modulation signals from the object during a reflection window; and a control component to: configure the modulation component to generate a first portion of the plurality of modulation signals using a first preconfigured phase shift output of the threshold number of preconfigured phase shift outputs; configure the modulation component to generate a second portion of the plurality of modulation signals using a second preconfigured phase shift output of the threshold number of preconfigured phase shift outputs; and instruct the emitter component to emit the plurality of modulated signals during the transmission window to emulate a measurement phase associated with the plurality of modulated signals based on the first portion of the plurality of modulation signals and the second portion of the plurality of modulation signals, wherein the measurement phase is different from the first preconfigured phase shift output and the second preconfigured phase shift output; and determine a distance to the object based on the measurement phase and a reflected phase associated with the plurality of reflected modulation signals.

According to some implementations, a method may include determining a measurement phase for a plurality of modulated signals, wherein the modulated signals are to be transmitted toward an object during a transmission window to emulate a measurement signal; identifying preconfigured phase shift outputs for the plurality of modulated signals; selecting a first preconfigured phase shift output for a first modulated signal of the plurality of modulated signals and a second preconfigured phase shift output for a second modulated signal of the plurality of the modulated signals, wherein the first modulated signal is to be transmitted during a first portion of the transmission window and the second modulated signal is to be transmitted during a second portion of the transmission window; calculating a first duration of the first portion of the transmission window and a second duration of the second portion of the transmission window based on the measurement phase, the first preconfigured phase shift output, and the second preconfigured phase shift output; and causing the first modulated signal to be transmitted for the first duration of the first portion of the transmission window and the second modulated signal to be transmitted for the second duration of the second portion of the transmission window, wherein the measurement signal is emulated to have the measurement phase using the first modulated signal for the first duration and the second modulated signal for the second duration.

DETAILED DESCRIPTION

The following detailed description of example implementations refers to the accompanying drawings. The same reference numbers in different drawings may identify the same or similar elements.

A time-of-flight (ToF) based imaging system (referred to herein as an imaging system) determines a distance from the imaging system to an object based on an amount of time that a modulated signal (e.g., a modulated optical signal, such as a series of light pulses) takes to travel to, and back from, the object. The amount of time is identified based on a difference between a phase of the modulated signal when emitted by a transmission component (e.g., an emitter component for an optical signal) of the imaging system and a phase of the modulated signal when received by a sensor component of the imaging system after being reflected off an object. Here, since the speed of light is known, the distance to the object is determined based on the identified amount of time. In some instances, the imaging system is a continuous wave (CW) ToF imaging system. In a CW ToF imaging system, the modulated signal is continuously emitted during transmission windows based on a modulation signal, such that a distance measurement can be made for each transmission window. The modulation signal may include a signal having a rectangular waveform (e.g., light on and light off), a sine waveform, or other waveforms. The modulation signal may have a frequency up to the radio frequency (RF) range (e.g., up to 150 MHz), but other frequencies may be used depending on the application and/or technology.

In some instances, the imaging system shifts a phase of the modulation signal from a reference signal so that the modulated signal is transmitted with a known phase (or phase shift). The accuracy of determining a distance to an object based on the transmitted and reflected modulated signal is dependent on the accuracy of the phase of the transmitted modulated signal. The imaging system may use a set of preconfigured phase shift circuits to shift the phase of the modulated signal. Accordingly, in such cases, in order for the imaging system to provide a wide variety of phases or phase shifts, the imaging system may require a corresponding number of phase shifting circuits. Furthermore, a phase shift circuit may be inaccurately configured to provide the phase shift as designed and/or, over time, the phase shift circuit may drift from the designed phase shift (e.g., due to wear and tear of the imaging system). As a result, when calculating a distance, the imaging system may use an inaccurate phase of the modulated signal when determining a phase shift between the transmitted modulated signal and the reflected modulated signal, resulting in an inaccurate distance measurement.

Some implementations described herein enable an imaging system to emulate a measurement phase of a measurement signal using multiple phase shifts of modulation periods of modulated signals transmitted during a transmission window. The multiple phase shifts may be relative to a reference signal and provided using preconfigured phase shift outputs from a set of phase shifters of the imaging system. For example, a distance measurement between an object and the imaging system may analyze many (e.g., hundreds, thousands, millions, and/or the like) modulation periods of the modulated signals (when transmitted and reflected). The measurement signal may be formed from the modulated signals that are transmitted during the transmission window. For example, a measurement signal may include multiple modulated signals with variously shifted modulation periods that are transmitted with various transmission window durations. Further, according to some implementations, an imaging system may be calibrated based on a known distance to an object and adjusting exposure times for transmitting modulated signals with different phase shifts from the reference signal to emulate a measurement phase for a measurement signal.

Accordingly, some implementations described herein provide an imaging system that may use a threshold number (e.g., five or less, ten or less, and/or the like) of preconfigured phase shift outputs (which may, for example, be generated by a corresponding number of preconfigured phase shifters) to emulate a measurement phase of a measurement signal emitted by the imaging system. As described herein, the imaging system may determine a measurement phase for a measurement signal of a transmission window, select one or more of the preconfigured phase shift outputs that may be used to emulate the measurement phase, and cause an emitter component to transmit the measurement signal using the one or more preconfigured phase shift outputs to emulate a modulated signal having the emulated measurement phase.

Accordingly, some implementations described herein may enable the imaging system to emulate phases that are different than the phase shift outputs of the phase shifters of the imaging system. As described herein, emulating a measurement phase may enable increased accuracy (e.g., over previous techniques) associated with determining a distance to an object by enabling calibration of the imaging system to emulate the measurement phase of the measurement signal. The imaging system may be calibrated by adjusting durations of portions of the transmission window within which the measurement signal has the different phases generated by the phase shifters (with each modulated signal of the measurement signal having a different phase). Accordingly, rather than relying on a single phase shifter to set the phase shift for the measurement signal during a transmission window (which is susceptible to any inaccuracies of the single phase shifter), the imaging system may use a plurality of phase shift outputs to emulate the measurement phase of the measurement signal from a same reference signal. The increased accuracy may prevent errors associated with a determined distance, that may result in loss of resources, such as computing resources (e.g., to correct the erroneously determined distance), hardware resources (e.g., resulting in physical damage based on the errors), and/or the like. Such errors may be catastrophic in certain applications, such as autonomous vehicle control that relies on measured distances to avoid collisions between an autonomous vehicle and other objects.

Because relatively few phase shifters can be used to emulate a relatively high number of phases for the measurement signal, space within a package (e.g., an integrated circuit (IC) package) of the imaging system and/or a surface area of a printed circuit board (PCB) used to generate a phase shift circuit can be conserved. For example, in previous techniques, the greater the number of phases that the imaging system is to use, the greater the number of corresponding phase shift circuits that needed to be included in a circuit of the imaging system. Accordingly, resources and/or components associated with providing a relatively high number of phase shifters can be reduced by using fewer phase shifters, which consumes less space and/or surface area, and by emulating a high number of phases for the measurement signal, as described herein.

Figure 1:
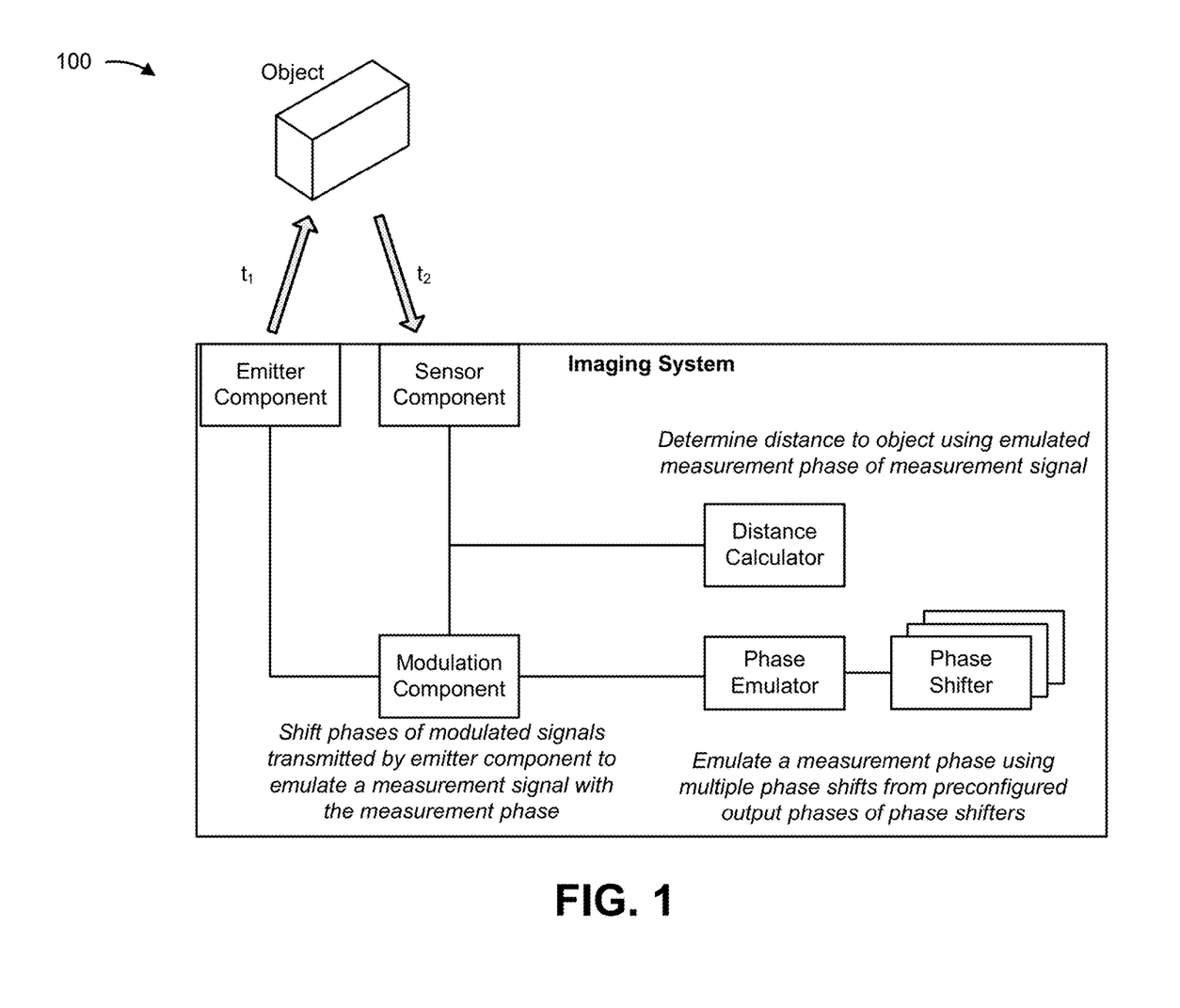
FIG. 1 is a diagram of an example implementation described herein.

FIG. 1 is a diagram of an example implementation 100 described herein. As shown in FIG. 1, an imaging system may include an emitter component, a modulation component, a sensor component, a phase emulator, a plurality of phase shifters (which may be referred collectively as "the phase shifters"), and a distance calculator. The emitter component may emit a measurement signal (formed, for example, from a plurality of modulated signals, such as modulated optical signals (e.g., light pulses)). A frequency and/or phase of the measurement signal may depend on modulation signals provided to the emitter component by the modulation component. Accordingly, in some implementations, a frequency and/or phase at which light pulses are emitted by the emitter component may match a frequency of the modulation signal. As shown, the modulation component also may provide the modulation signals to the sensor component and/or distance calculator (e.g., for use in determining distances).

As shown in example implementation 100, the measurement signal may take time $t_1$ to reach an object, may be reflected by the object, and may take time $t_2$ to reach the sensor component (e.g., such that the measurement signal is received at one or more pixels of an array of photosensitive pixels included in the sensor component). The imaging system (e.g., via the distance calculator) may determine a distance to the object based on a phase shift between a phase of the received reflected measurement signal (which may be a reflected modulated optical signal received at a pixel of the sensor component) and a phase of the measurement signal (e.g., by determining a time of flight based on the phase shift, and by determining a distance based on the time of flight). The phase of the measurement signal may be determined based on an average (e.g., a mean) phase of periods of the measurement signal and the phase of the reflected signal may be determined based on an average of periods of the reflected signal. As shown in FIG. 1, the modulation component may shift one or more phases of the measurement signal (e.g., phases of periods of modulation signals) using a phase emulator and the phase shifters to shift one or more periods of a modulation signal to the emitter component. In some implementations, the modulation component may shift one or more periods of a modulation signal provided to pixels of the sensor component using the phase emulator and the phase shifters. Accordingly, respective modulation signals to the emitter component and the sensor component are shifted relative to one another. Each of the phase shifters may be preconfigured to shift the phases of one or more periods of the measurement signal a specific number of degrees (e.g., 45 degrees, 90 degrees, 180 degrees, 270 degrees, and/or the like) from a reference signal (e.g., a clock signal of the phase shifters). In some implementations, either the modulation signal to the emitter component or the modulation signal to the sensor component is shifted, as described herein. In such cases, the modulation period that is not shifted may correspond to the reference signal.

To make a distance measurement, the measurement signal of FIG. 1 may be transmitted during a transmission window. For example, the imaging system may use a transmission window (having a threshold duration) to determine each distance measurement. Furthermore, each transmission window may have a corresponding reflection window, during which the reflected measurement signal (which is formed from a plurality of reflected modulated signals) is received by the sensor component. The transmission window may have a duration that allows for the measurement signal to include many periods (e.g., hundreds, thousands, millions, and/or the like) during the transmission window. The transmission window may include separate portions, during which the measurement signal is transmitted with different phases (e.g., modulated signals with different phases) using the phase shift outputs of the phase shifters. For example, the phase emulator may emulate a phase that is different from any of the phase shift outputs of the phase shifters by causing the measurement signal to have a first phase using a first phase shift output for a first portion of the transmission window and causing the measurement signal to have a second phase using a second phase shift output for a second portion of the transmission window. Accordingly, the measurement signal may be transmitted with different phases during different portions of the transmission window. The emulated phase of the measurement signal may correspond to the average of the phases of the periods of the measurement signal. The average may be a weighted average that is weighted based on the duration of the portions of the transmission window during which the measurement signal was transmitted with the respective phase shifts.

The measurement signal may be referred to herein as including (and/or being emulated by) a plurality of modulated signals corresponding to the plurality of different phases of the measurement signal. In other words, the measurement signal may include a first modulated signal that has a first phase and is transmitted for a first duration of the transmission window and a second modulated signal that has a second phase and is transmitted for a second duration of the transmission window. Furthermore, in some implementations, the measurement signal may include a third modulated signal that has a third phase and is transmitted for a third duration of the transmission window, a fourth modulated signal that has a fourth phase and is transmitted for a fourth duration of the transmission window, and so on. Correspondingly, a reflected signal that is received by the imaging system may include a plurality of reflected signals corresponding to the plurality of different phases of the emitted measurement signal.

The phase emulator may identify the measurement phase for the measurement signal. The measurement phase may be identified based on a phase setting of the imaging system. The phase setting may correspond to a designed phase (or default phase) for the measurement signal emitted by the imaging system, a phase provided via a user input, and/or the like. In some implementations, as described herein, the phase emulator may calibrate the imaging system to set the measurement phase for the measurement signal. For example, using a known distance to the object and a measured distance to the object, the phase emulator may adjust the settings for the measurement signal based on a difference between the known distance and the measured distance. More specifically, the phase emulator may adjust which phase shifts are added to the measurement signal (e.g., from the phase shifters) and corresponding durations at which the measurement signal is transmitted with those phase shifts during the transmission window.

The distance calculator of the imaging system may process the reflected measurement signal received by the sensor component during the reflection window. For example, the distance calculator may determine the emulated measurement phase by averaging the phases of the modulated signals transmitted during the transmission window. Furthermore, the distance calculator may average the phases of the reflected modulated signals to determine a reflected phase of the reflected measurement signal received during the corresponding reflection window of the transmission window. The distance calculator may then determine, from the measurement phase and the reflected phase, a distance to the object based on a difference between the measurement phase and the reflected phase. For example, the distance calculator may use a known speed of the measurement signal and/or reflected signal (e.g., the speed of light or other constant speed) and the phase difference to determine the distance to the object.

The number of phase shifters in the imaging system may be limited to a threshold number and/or a number of phase shifters according to a design of the imaging system. For example, there may be five or less phase shifters (or eight or less, ten or less, and/or the like) to conserve space within a package of the imaging system (e.g., within an integrated circuit (IC) and/or on a printed circuit board (PCB) of the imaging system).

Accordingly, the imaging system of FIG. 1 may use various phase shifts within a measurement signal that is transmitted during a transmission window to emulate a measurement phase for the measurement signal that is different from a phase shift output of the phase shifters of the imaging system.

As indicated above, FIG. 1 is provided merely as an example. Other examples may differ from what was described with regard to FIG. 1.

Figure 2:
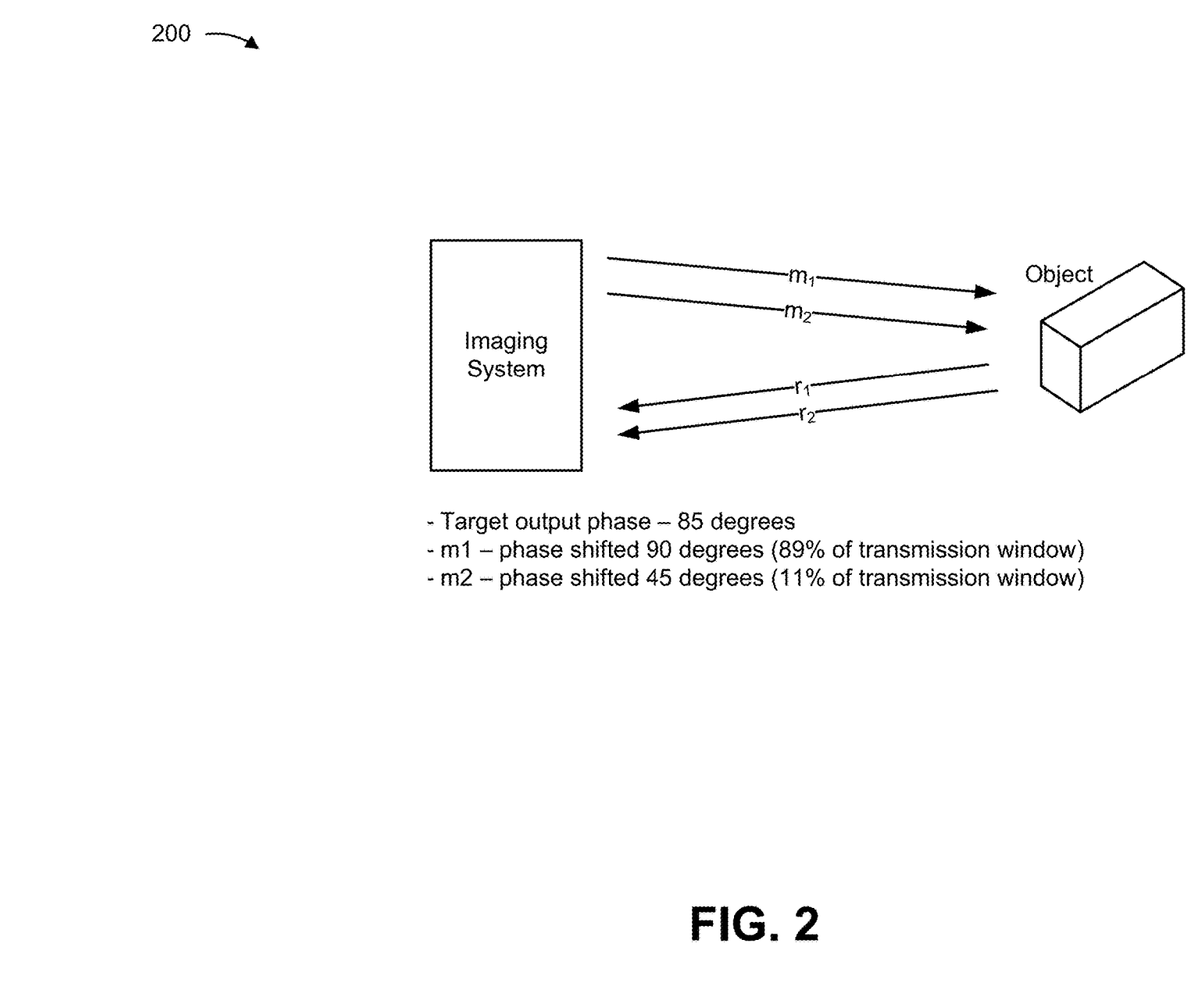
FIG. 2 is a diagram of an example implementation described herein.

FIG. 2 is a diagram of an example implementation 200 described herein. In FIG. 2, the imaging system is shown sending modulated signals $m_1$, $m_2$ during a transmission window toward an object and receiving reflected modulated signals $r_1$, $r_2$ from the object during a reflection window. Modulated signals $m_1$, $m_2$ may, together, form a measurement signal, as described herein, and reflected modulated signals $r_1$, $r_2$ may, together, form a reflected signal, as described herein. The imaging system may send modulated signal $m_1$ during a first portion of the transmission window and modulated signal $m_2$ during a second portion of the transmission window. Furthermore, the imaging system may receive reflected modulated signal $r_1$ during a first portion of the reflection window and reflected modulated signal $r_2$ during a second portion of the reflection window. The imaging system may configure durations of sending modulated signals $m_1$, $m_2$ during the transmission window to emulate a phase of the measurement signal.

As shown, to emulate a target output phase of 85 degrees, the imaging system may, for example, use a 90 degree phase shifter and a 45 degree phase shifter. For example, modulated signal $m_1$ may be shifted 90 degrees and modulated signal $m_2$ may be shifted 45 degrees. To emulate an 85 degree phase shift for the measurement signal transmitted during the transmission window, modulated signal $m_1$ may be transmitted for 89% of the transmission window and modulated signal $m_2$ may be transmitted for 11% of the transmission window (e.g., based on determining a weighted average for transmitting the modulated signals $m_1$, $m_2$). Accordingly, the emitted measurement signal, with the emulated 85 degree phase shift, may provide reflected modulated signals $r_1$, $r_2$ with phase shifts that, when averaged, provide a reflected phase of the reflected signal. The difference between the reflected phase and the 85 degree phase shift may indicate a distance between the object and the imaging system of FIG. 2.

As indicated above, FIG. 2 is provided merely as an example. Other examples may differ from what was described with regard to FIG. 2.

Figure 3:
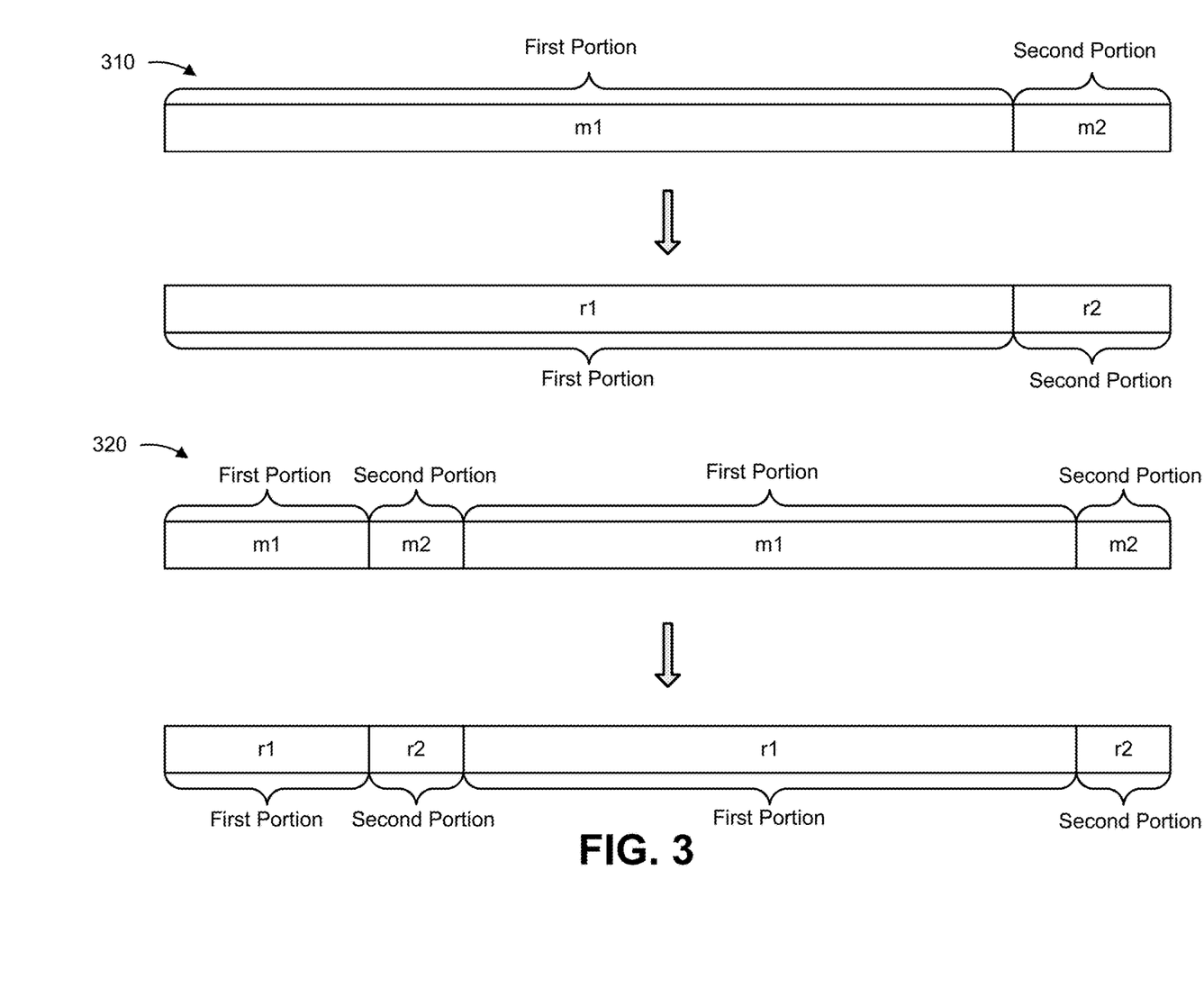
FIG. 3 includes diagrams of example implementations of transmission windows and reflection windows described herein.

FIG. 3 includes diagrams of example implementations 310, 320 with transmission windows and reflection windows as described herein. In some implementations, the transmission windows and reflection windows of implementations 310, 320 may partially or entirely overlap in time (e.g., the imaging system receives a reflected signal while transmitting a corresponding measurement signal). Alternatively, the transmission windows and reflection windows may be non-overlapping (e.g., the reflection window occurs after the transmission window has ended).

As shown in FIG. 3, in example implementation 310, a transmission window for sending modulated signals $m_1$, $m_2$ (corresponding to the modulated signals $m_1$, $m_2$ of FIG. 2) may include a first portion and a second portion. As shown, the first portion corresponds to the duration of the transmission window during which modulated signal $m_1$ is transmitted and the second portion of the transmission window corresponds to the duration during which modulated signal $m_2$ is transmitted. In example implementation 310, the first portion of the transmission window may occur before the second portion of the transmission window. In other words, in example implementation 310, modulated signal $m_1$ is transmitted before modulated signal $m_2$. Accordingly, as shown, the reflection window includes a first portion with reflected modulated signal $r_1$ being received and a second portion with reflected modulated signal $r_2$ being received.

As further shown in FIG. 3, in example implementation 320, the first portion of the transmission window may be divided into multiple segments. For example, as shown, one segment of the first portion of the transmission window may occur between two segments of the second portion of the transmission window. Accordingly, in some implementations, transmissions of modulated signals $m_1$, $m_2$ may alternate during the transmission window. For example, during the transmission window, modulated signal $m_1$ may be transmitted for a first segment of the first portion of the transmission window, then modulated signal $m_2$ may be transmitted for a first segment of the second portion of the transmission window, then modulated signal $m_1$ may be transmitted for a second segment of the first portion of the transmission window, then modulated signal $m_2$ may be transmitted for a second segment of the second portion of the transmission window, and so on. Accordingly, as shown, the reflection window includes a corresponding segment of a first portion of the reflection window that includes reflected modulated signal r1 between two segments of the second portion of the reflection window that include reflected modulated signal $r_2$.

The durations of the first portion and the second portion of the transmission window may correspond to a weighted average of the phases of the modulated signals $m_1$, $m_2$ used to emulate a measurement phase of the measurement signal transmitted during the transmission window. Accordingly, by varying the phase shifts during the transmission window, for various portions of the transmission window, various phases of a measurement signal can be emulated, as described herein.

As indicated above, FIG. 3 is provided merely as an example. Other examples may differ from what was described with regard to FIG. 3. For example, the transmission windows (and the reflection windows) of FIG. 3 may include a third portion, a fourth portion, etc., for modulated signals to be transmitted with additional phase shifts other than modulated signals $m_1$, $m_2$. Furthermore, the portions of the transmission windows (and the reflection windows) may be further divided into more segments than those shown in FIG. 3.

Figure 4:
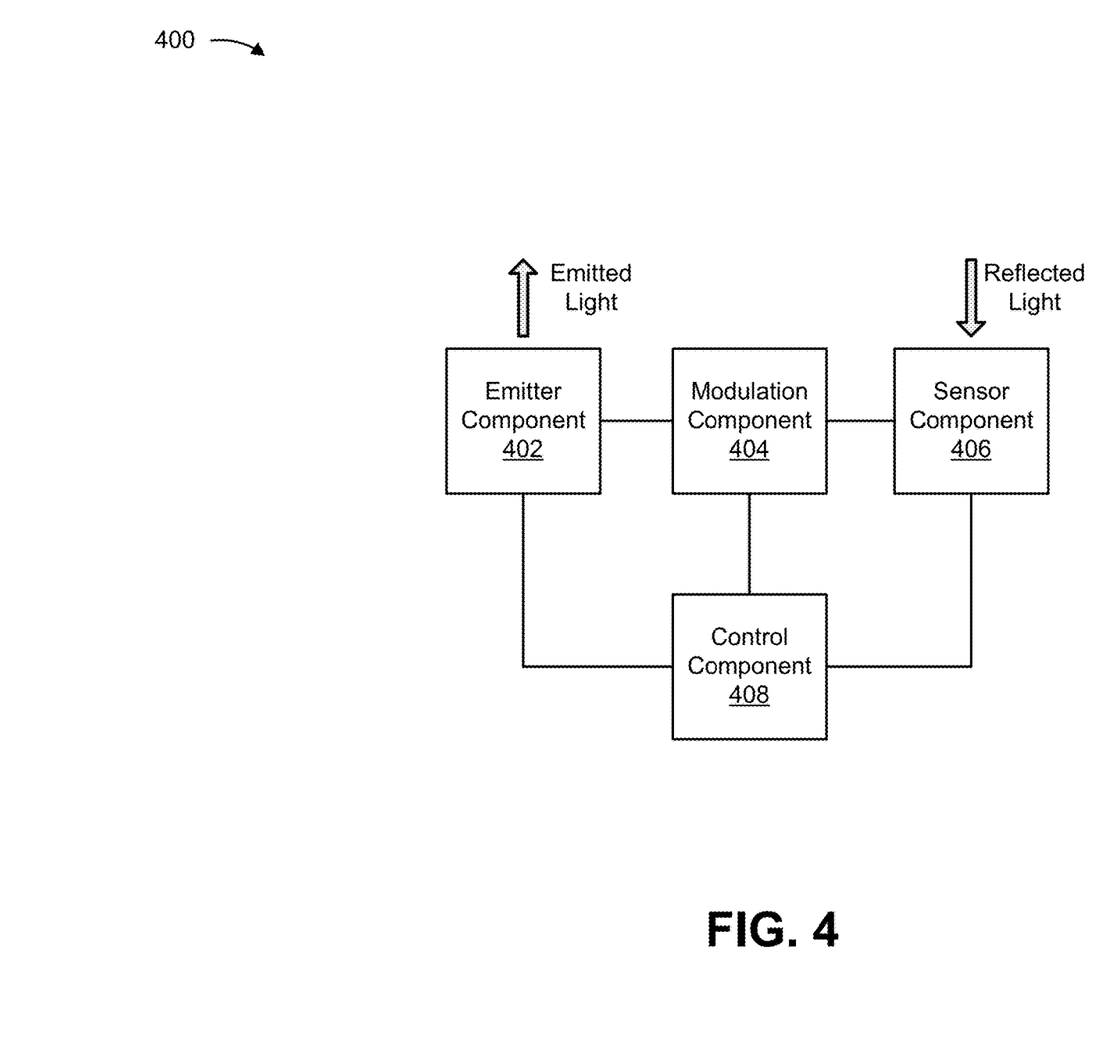
FIG. 4 is a diagram of example components of an imaging system.

FIG. 4 is a diagram of example components of an example imaging system 400. As shown, imaging system 400 includes an emitter component 402, a modulation component 404, a sensor component 406, and a control component 408. The example components of imaging system 400 may be implemented in hardware, firmware, or a combination of software executing on hardware. In some implementations, the example components of imaging system 400 may be implemented via a circuit of a PCB and/or an IC. The circuits of the example components may include one or more transistors, one or more diodes, and/or other circuitry.

Emitter component 402 includes a component to emit a measurement signal, such as a modulated signal (e.g., light, such as infrared light). In some implementations, emitter component 402 includes a light emitter, such as a light-emitting diode (LED), a laser emitter, and/or the like. In some implementations, emitter component 402 may be capable of emitting a measurement signal in order toward an environment (e.g., a predetermined area) in which distances to objects are to be determined. Additionally, or alternatively, emitter component 402 may be capable of emitting a measurement signal toward the environment in pulses, stages, scans, and/or the like. The measurement signal may be one or more types of signals (e.g., optical signals, sonar signals, RF signals, and/or the like) emitted from emitter component 402. For example, emitter component 402 may emit one or more forms of modulated optical signals, such as one or more modulated light pulses. In some implementations, emitter component 402 may be switched on and off according to a modulation signal for a transmission window, allowing a measurement signal (formed, for example, from a plurality of modulated signals) to be emitted toward an area, including toward any objects within the area during the transmission window and/or during portions of the transmission window (e.g., during portions when emitter component is operating to emit modulated signals).

Modulation component 404 includes a component associated with modulating one or more modulation signals to generate the measurement signal emitted by emitter component 402. In some implementations, modulation component 404 causes a modulation signal to be generated based on a phase shift signal received from control component 408 (e.g., a signal that identifies a frequency at which emitter component 402 is to switch an emission source (e.g., a light source, a sonar source, and/or the like) on and off and a phase at which the measurement signal is to be emitted). In some implementations, modulation component 404 may modulate one or more modulation signals provided to sensor component. In some implementations, modulation component 404 may be capable of correlating the modulation of the phase shift signal with the modulation of sensor component 406 (e.g., the modulation of photosensitive pixels of sensor component 406) during ToF operation (e.g., to enable a distance between an object and imaging system 400 to be calculated).

Sensor component 406 may be a component capable of receiving a measurement signal after being reflected by an object. A measurement signal that is reflected by an object is referred to herein as "a reflected signal." In some implementations, sensor component 406 may include an array of photosensitive pixels to receive the reflected signal. In one example, individual photosensitive pixels of the array may be individual image sensors. In such an example, a resulting image from sensor component 406 may be a combination of the sensor images of the individual photosensitive pixels. In some implementations, a given photosensitive pixel may be capable of converting the reflected modulated optical signal into an electrical signal. In some implementations, signals from the pixels may be processed into an image by one or more processing components of sensor component 406. In some implementations, sensor component 406 may be capable of capturing one or more images of an area, or of object(s) within the area. For example, sensor component 406 may capture a three-dimensional image of the area.

Additionally, or alternatively, sensor component 406 may use ToF principles to capture a three-dimensional image of an object within an area, based on modulated signals reflecting from the object. For example, in some implementations, sensor component 406 can detect whether an object is in the area based on an amount of time taken for the measurement signal, emitted from emitter component 402, to be reflected back to the photosensitive pixels of sensor component 406 (e.g., based on a phase shift between the emitted optical signal and the received optical signal). Additionally, or alternatively, sensor component 406 may be capable of determining a distance to the object based on the reflected signals received at the array of photosensitive pixels.

Control component 408 is a component capable of controlling one or more components and/or functions of imaging system 400. As described herein, control component 408 may cause emitter component 402 (e.g., via modulation component 404) to emit a measurement signal (formed from a plurality of modulated signals with various phases) toward an object, such that a phase of the measurement signal is defined by a plurality of phases of the measurement signal (e.g., a weighted average of the plurality of phases of the modulated signals).

In some implementations, control component 408 may include a phase shift component and/or may be capable of causing a phase of a measurement signal and/or modulation signal to be shifted. The phase shift component may include or correspond to the phase shifters of FIG. 1. The phase shift component may include a preconfigured number or threshold number of phase shifters. The preconfigured number and/or threshold number of phase shifters may be relatively low (e.g., 5 or less) in order to have a relatively small footprint within an IC and/or on a PCB of imaging system 400. The preconfigured number and/or threshold number may be limited according to a design of imaging system 400.

In some implementations, control component 408 may include a phase emulator (e.g., the phase emulator of FIG. 1) and/or may be capable of causing a phase shift of a measurement signal to be emulated, as described herein. The control component may determine and/or identify a measurement phase that is to be emulated. For example, the measurement phase may be set by a user (e.g., via a user input), may be configured for the imaging system (e.g., during manufacturing), and/or may be calibrated (e.g., during calibration) for the imaging system. To emulate the measurement phase, control component 408 may select a first phase and (optionally) a second phase based on the measurement phase. For example, the measurement phase may be between the first phase and the second phase so that a weighted average of the first phase and the second phase can be used to emulate the measurement phase. To cause modulation component 404 and/or emitter component 402 to emulate the measurement phase, control component 408 may calculate a first duration of a first portion of a transmission window and a second duration of a second portion of the transmission window based on the first phase and the second phase. For example, the durations of the first portion and the second portion of the transmission window may correspond to the weighted average of the first phase and the second phase to emulate the measurement phase. The following example relationship may be used to calculate the measurement phase:

$$\frac{t_1 p_1 + t_2 p_2}{t_w} = p_m \qquad (1)$$

where $t_1$ and $t_2$ are durations of the first and second portions of a transmission window with duration $t_w$ and $p_1$ and $p_2$ are phases of modulated signals used to emulate measurement phase $p_m$ of the measurement signal.

In some implementations, control component 408 may include a distance calculator (e.g., the distance calculator of FIG. 1) to determine a distance between an object and imaging system 400 and/or may be capable of determining or calculating a distance between an object and imaging system 400 based on a detected difference in a phase of a measurement signal and a reflected signal from the object. For example, control component 408 may determine an amount of time for the measurement signal to travel from emitter component 402, to the object, and reflect back to sensor component 406. Accordingly, control component 408 may receive the plurality of reflected signals, for example, or a reflected signal with a plurality of different phase shifts, and determine a reflected phase of the plurality of reflected signals based on an average (e.g., weighted average) of the phases of the plurality of reflected signals.

After calculating the distance between an object and imaging system 400, control component 408 may cause a distance measurement and/or distance information associated with the distance to be displayed on a user interface. For example, control component may be in communication with a display system and/or user device that includes a user interface. Control component 408 may provide the distance information to the display system and/or user device that is communicatively coupled to imaging system 200 to cause the display system and/or user device to display the distance. In some implementations, control component 408 may be communicatively coupled with a control system and/or alert system. In such cases, control component 408 may be configured to determine that the distance is within a threshold range and transmit an alert to the control system and/or alert system based on determining that the object is within the threshold range. For example, the control system may control a vehicle to brake in order to avoid hitting the object and/or steer away from the object. The alert system may sound an alarm or flash an alert to notify a user that the object is within the threshold range.

In some implementations, control component 408 may include a calibration component and/or may be capable of calibrating imaging system 400 to ensure that phases of modulated signals (and/or measurement signals formed from the modulated signals) emitted by emitter component 402 are accurate (e.g., to within a threshold tolerance). Accordingly, control component 408 may calibrate emitter component 402, modulation component 404, and/or sensor component 406 by emulating a desired phase for the measurement signal. For example, although one or more phase shifters may be configured to provide corresponding phase shift outputs, the phase shift outputs may not be accurate. Control component 408 may calibrate imaging system 400 to address inaccuracies of the one or more phase shifters by emulating a desired phase (e.g., a target phase that the one or more phase shifters are configured to output) for a modulated signal and/or measurement signal that is output from imaging system 400.

To calibrate imaging system 400, control component 408 may enter a calibration mode. In such a mode, imaging system 400 may be configured to detect an object (which may be referred to herein as a "calibration object") at a known distance from imaging system 400. The known distance may be configured by a user (e.g., by the user setting the object at the known distance from imaging system 400, or vice versa), by a machine (e.g., a machine used during manufacturing of imaging system 400), and/or the like. In some implementations, control component 408 may obtain the known distance via a user input, via a distance associated with the calibration mode (e.g., control component 408 may indicate that the user is to set the object at the known distance based on the calibration mode using a known distance for calibration of imaging system 400), and/or the like.

In a calibration mode, control component 408 may cause emitter component 402 to transmit a calibration signal (which may, for example, include a plurality of modulated signals having the same phases or various phases) during a calibration window using a first calibration setting. The calibration window may have a duration that allows for the calibration signal to include many periods (e.g., hundreds, thousands, millions, and/or the like) during the calibration window. The first calibration setting may use a first set of preconfigured phase shift outputs from one or more phase shifters of control component 408. Accordingly, the phase shifters of control component 408 may phase shift the modulation periods of the calibration signal. The first calibration setting may correspond to a default setting and/or a desired setting (as specified by a user and/or design of imaging system 400). For example, the first setting may be meant to transmit the calibration signal with a specific phase shift, such as a 90 degree phase shift, that uses a 90 degree phase shifter to shift the phase of the calibration signal.

Further, while in calibration mode, control component 408 may obtain, via sensor component 406, a reflected calibration signal (e.g., which may be comprised of a plurality of reflected calibration signals with various phases) corresponding to reflections of the plurality of calibration signals being reflected from the calibration object. Control component 408 may determine a measured distance associated with the calibration object based on a measured phase shift of the reflected calibration signal relative to the phase shift of the calibration signal. For example, control component 408 may compare the measured distance with the known distance to determine whether the measured distance is within a threshold range of the known distance. The threshold range may correspond to a tolerance (e.g., an industrial tolerance, a manufacturing tolerance, and/or the like). If the measured distance does not satisfy the threshold tolerance, control component 408 may determine that the first calibration setting is to be adjusted to a second calibration setting to address inaccuracies in the phase shift of the first setting.

Referring to the above example, control component 408 may compare the difference between the measured distance and the known distance to determine whether imaging system 400 needs to be calibrated to account for the 90 degree phase shifter of control component 408 being inaccurate. For example, if the measured distance corresponds to a phase shift that indicates that the 90 degree phase shifter is shifting modulation periods less than 90 degrees, control component 408 may configure emitter component 402 and/or modulation component 404 to use a higher degree phase shifter (e.g., a 135 degree phase shifter, a 180 degree phase shifter, and/or the like) to shift some modulation periods of a subsequent calibration signal and/or a measurement signal in order to emulate a true 90 degree phase shift (e.g., within a tolerance range of 90 degrees). On the other hand, if the measured distance corresponds to a phase shift that indicates that the 90 degree phase shifter is shifting modulation periods more than 90 degrees, control component 408 may configure emitter component 402 and/or modulation component 404 to use a lower degree phase shifter (e.g., a 0 degree phase shifter, a 45 degree phase shifter, and/or the like) to shift some modulation periods of a subsequent calibration signal and/or the measurement signal in order to emulate a true 90 degree phase shift.

Accordingly, in a calibration mode, control component 408 may configure the second calibration setting to adjust a first set of preconfigured phases of the first calibration setting to a second set of preconfigured phases for the measurement signal. In some implementations, phase shift outputs used to emulate a first calibration signal may be the same phase shift outputs used to emulate a second calibration signal (and/or the measurement signal), but durations of transmitting the calibration signals with the respective phase shifts may vary. In other words, the weights of the phase shifts may differ. For example, control component 408 may transmit a first calibration signal to include modulation periods with 90 degree phase shifts and 180 degree phase shifts to emulate a 135 degree phase shift in the first calibration signal. In such a case, the duration of transmitting the first calibration signal with a 90 degree phase shift is equal to the duration of transmitting the first calibration signal with the 135 degree phase shift (i.e., 50% of calibration window with 90 degree phase shift and 50% of calibration window with 180 degree phase shift) because 135 degrees is the average of 90 degrees and 180 degrees. However, if control component 408 determines, during calibration mode, that the first calibration signal has a 140 degree phase shift (based on the known distance to the calibration object being different from the measured distance), rather than the desired or expected 135 degree phase shift, control component 408 may increase the duration of the 90 degree phase shift in the second calibration signal (or measurement signal) and decrease the duration of the 180 degree phase shift (i.e., <50% of calibration window with 90 degree shift and >50% of calibration window with 180 degree) to decrease the phase shift of the second calibration signal to be within a threshold range of 135 degrees.

Accordingly, control component 408 may be configured to calibrate imaging system 400 to accurately emit measurement signals within a threshold tolerance, thus resulting in imaging system 400 being able to accurately determine a distance between imaging system 400 and an object. Furthermore, imaging system 400 may provide increased accuracy over previous techniques while using a reduced number of phase shifters, which may lessen the size of a phase shift circuit, resulting in fewer components and/or less materials being used (e.g., for housing, ICs, PCBs, and/or the like).

The number and arrangement of components shown in FIG. 4 are provided as examples. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed devices and/or components. Additionally, or alternatively, a set of components (e.g., one or more components) shown in FIG. 4 may perform one or more functions described as being performed by another set of components shown in FIG. 4.

Figure 5:
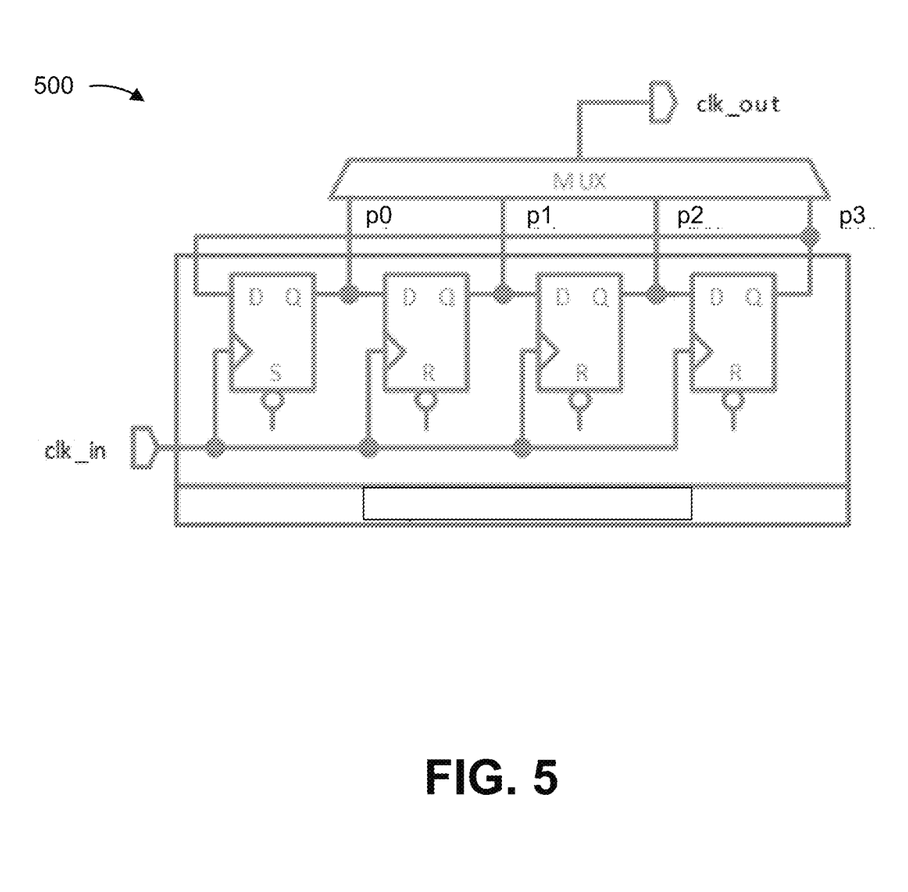
FIG. 5 is a diagram of an example phase shift circuit of an example imaging system, described herein.

FIG. 5 is a diagram of example components of a phase shift circuit 500 of example imaging system 400, described herein. Phase shift circuit 500 may be a component of control component 408. As shown in FIG. 5, phase shift circuit 500 may include a ring shift register configured to output a phase based on a received input reference signal (clk_in). The ring shift register may be configured to cycle a bit (e.g., a 0 or 1) and/or receive a pattern of bits to output a signal (clk_out) with phases p0, p1, p2, and/or p3 via a multiplexer (MUX). For example, phase shift circuit 500 may receive a pattern of '1000' to output phase shift p0, '0100' to output phase shift p1, '0010' to output phase shift p2, and '0001' to output phase shift p3. Furthermore, a pattern with multiple '1's may cause the corresponding phase shifts to be added to the output. For example, to output a signal to include modulation periods with phase shift p1 and phase shift p2, the pattern received by phase shift circuit 500 may be '0110.'

In addition to, or alternative to, the ring shift register of phase shift circuit 500, phase shift circuit 500 may include a delay chain. The delay chain may remove any feedback from one or more output phases. Accordingly, a configurable or random pattern may be clocked through the delay chain. Such a pattern can be continuously repeated by another ring shift register.

In this way, control component 408 may include a phase shift circuit 500 with a relatively limited number of phase shifters (shown as four) to emulate a phase of a measurement signal, as described herein.

As indicated above, FIG. 5 is provided merely as an example. Other examples may differ from what was described with regard to FIG. 5.

Figure 6:
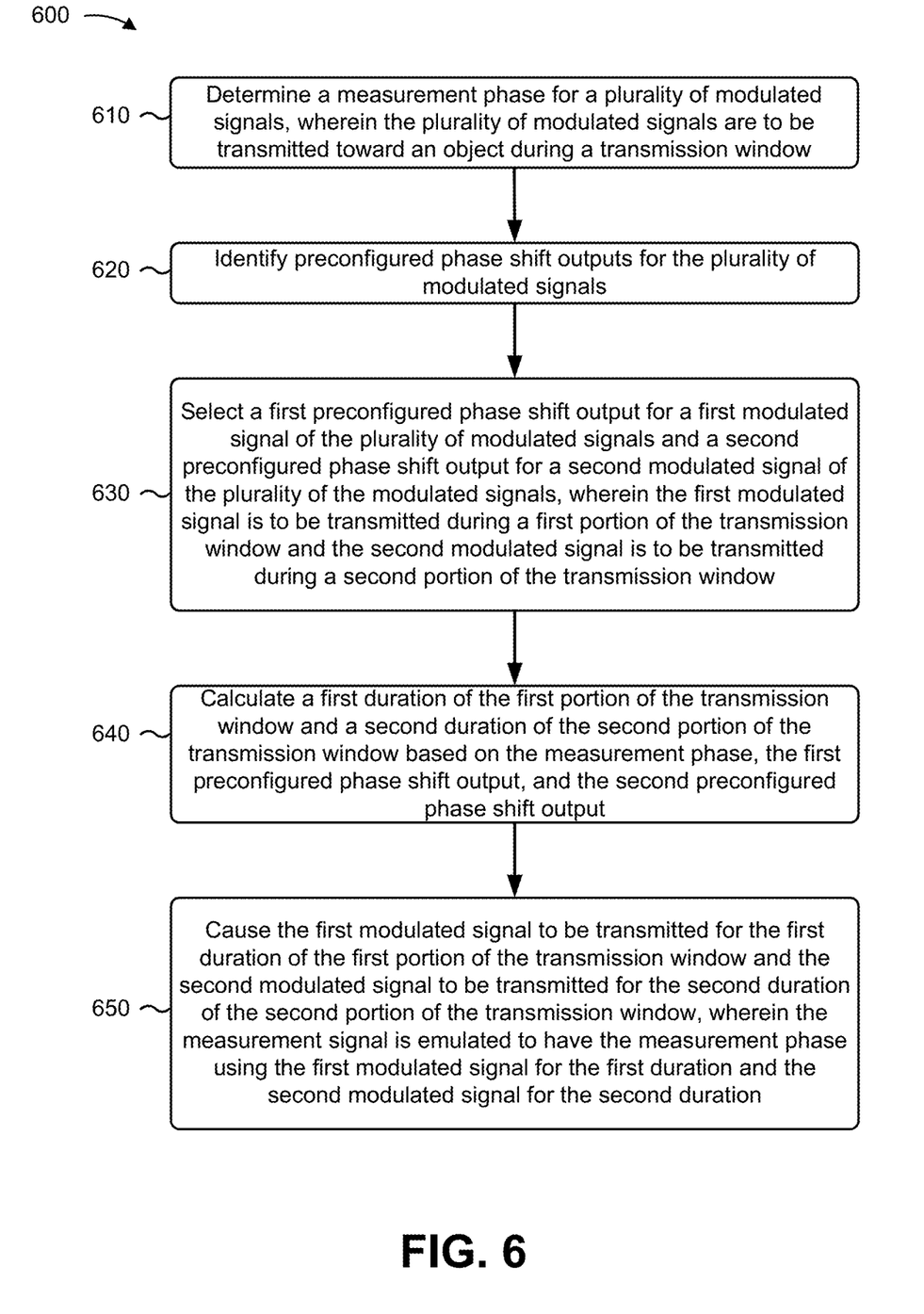
FIG. 6 is a flow chart of an example process for emulating a phase of a measurement signal for a time-of-flight (ToF) device.

FIG. 6 is a flow chart of an example process 600 for emulating a phase of a measurement signal for a time-of-flight (ToF) device. In some implementations, one or more process blocks of FIG. 6 may be performed by a control component (e.g., control component 408) of an imaging system (e.g., imaging system 400).

As shown in FIG. 6, process 600 may include determining a measurement phase for a plurality of modulated signals, wherein the plurality of modulated signals are to be transmitted toward an object during a transmission window (block 610). For example, the control component may determine a measurement phase for a plurality of modulated signals, as described above. In some implementations, the plurality of modulated signals are to be transmitted toward an object during a transmission window.

As further shown in FIG. 6, process 600 may include identifying preconfigured phase shift outputs for the plurality of modulated signals (block 620). For example, the control component (e.g., via one or more phase shifters) may identify preconfigured phase shift outputs for the plurality of modulated signals, as described above.

As further shown in FIG. 6, process 600 may include selecting a first preconfigured phase shift output for a first modulated signal of the plurality of modulated signals and a second preconfigured phase shift output for a second modulated signal of the plurality of the modulated signals, wherein the first modulated signal is to be transmitted during a first portion of the transmission window and the second modulated signal is to be transmitted during a second portion of the transmission window (block 630). For example, the control component (e.g., using a phase emulator) may select a first preconfigured phase shift output for a first modulated signal of the plurality of modulated signals and a second preconfigured phase shift output for a second modulated signal of the plurality of the modulated signals, as described above. In some implementations, the first modulated signal is to be transmitted during a first portion of the transmission window and the second modulated signal is to be transmitted during a second portion of the transmission window.

As further shown in FIG. 6, process 600 may include calculating a first duration of the first portion of the transmission window and a second duration of the second portion of the transmission window based on the measurement phase, the first preconfigured phase shift output, and the second preconfigured phase shift output (block 640). For example, the control component (e.g., using a phase emulator) may calculate a first duration of the first portion of the transmission window and a second duration of the second portion of the transmission window based on the measurement phase, the first preconfigured phase shift output, and the second preconfigured phase shift output, as described above.

As further shown in FIG. 6, process 600 may include causing the first modulated signal to be transmitted for the first duration of the first portion of the transmission window and the second modulated signal to be transmitted for the second duration of the second portion of the transmission window, wherein the measurement signal is emulated to have the measurement phase using the first modulated signal for the first duration and the second modulated signal for the second duration (block 650). For example, the control component may cause the first modulated signal to be transmitted for the first duration of the first portion of the transmission window and the second modulated signal to be transmitted for the second duration of the second portion of the transmission window, as described above. In some implementations, the measurement signal is emulated to have the measurement phase using the first modulated signal for the first duration and the second modulated signal for the second duration.

Process 600 may include additional implementations, such as any single implementation or any combination of implementations described below and/or in connection with one or more other processes described elsewhere herein.

In some implementations, at least one segment of the first portion of the transmission window may occur between two segments of the second portion of the transmission window. In some implementations, the first portion of the transmission window may occur before the second portion of the transmission window. In some implementations, the measurement phase may be between the first preconfigured phase shift output and the second preconfigured phase shift output.

In some implementations, the control component may determine a distance to the object based on a plurality of reflected signals from the object. In some implementations, the plurality of reflected signals may correspond to the plurality of modulated signals reflecting off the object. In some implementations, the distance may be determined based on a phase shift between the plurality of reflected signals and the plurality of modulated signals.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A time-of-flight device, comprising:
   an emitter component configured to emit a plurality of modulated signals toward an object during a transmission window,
      wherein the plurality of modulated signals emitted during the transmission window are to be used to determine a single distance measurement associated with the object and the time-of-flight device;
   a control component configured to:
      cause, via the emitter component, emission of a first modulated signal and emission of a second modulated signal, of the plurality of modulated signals, toward the object,
         wherein the first modulated signal is emitted during a first portion of the transmission window and has a first phase of a plurality of preconfigured phases, and
         wherein the second modulated signal is emitted during a second portion of the transmission window and has a second phase of the plurality of preconfigured phases; and
      cause, using the emission of the first modulated signal and the emission of the second modulated signal during the transmission window, an emulation of a transmission of a measurement signal that has a measurement phase defined based on the first phase and the second phase, wherein the measurement phase is different from the first phase and the second phase.

2. The time-of-flight device of claim 1, wherein the control component is to:
   determine the measurement phase;
   select the first phase and the second phase based on the measurement phase; and
   calculate a first duration of the first portion of the transmission window and a second duration of the second portion of the transmission window based on the first phase and the second phase.

3. The time-of-flight device of claim 1, wherein the measurement phase is between the first phase and the second phase.

4. The time-of-flight device of claim 1, wherein the measurement phase based on a weighted average of the first phase and the second phase,
   wherein the weighted average is weighted based on a first duration of the first portion of the transmission window and a second duration of the second portion of the transmission window.

5. The time-of-flight device of claim 1, further comprising:
   a sensor component to detect a plurality of reflected signals from the object during a reflection window;
   wherein the control component is further to:
     receive information concerning the plurality of reflected signals;
     determine a reflected phase of the plurality of reflected signals; and
     determine a distance associated with the object based on the measurement phase and the reflected phase.

6. The time-of-flight device of claim 5, wherein the distance is determined based on a difference between the measurement phase and the reflected phase.

7. The time-of-flight device of claim 1, wherein the control component is further to:
   cause the emitter component to transmit a plurality of calibration signals during a calibration window using a first calibration setting,
     wherein the first calibration setting uses a first set of preconfigured phases for the plurality of calibration signals;
   receive information concerning a plurality of reflected calibration signals from a calibration object at a known distance from the time-of-flight device;
   determine a measured distance associated with the calibration object based on a measured phase shift of the plurality of reflected calibration signals; and
   adjust the first calibration setting to a second calibration setting of the emitter component based on the measured distance and the known distance,
     wherein the second calibration setting adjusts the first set of preconfigured phases to a second set of preconfigured phases for the plurality of modulated signals.

8. The time-of-flight device of claim 7, wherein the control component is further to:
   determine a target phase associated with the known distance; and
   determine the second calibration setting based on the target phase and the measured phase shift.

9. The time-of-flight device of claim 7, wherein phase shift outputs used in the first set of preconfigured phases are same phase shift outputs used in the second set of preconfigured phases and corresponding durations of transmitting the plurality of calibration signals during the calibration window are different than durations of transmitting the plurality of modulated signals during the transmission window.

10. The time-of-flight device of claim 1, wherein the control component is further configured to:
    cause, via the emitter component, emission of a third modulated signal, of the plurality of signals, toward the object,
      wherein the third modulated signal is emitted during a third portion of the transmission window and has a third phase of the plurality of preconfigured phases,
      wherein the measurement phase is defined based on the first phase, the second phase, and the third phase,
      wherein the measurement phase is different from the third phase.

11. An imaging system comprising:
    a modulation component to provide a plurality of modulation signals,
      wherein the modulation component is to generate the plurality of modulation signals to include phase shifts using a threshold number of preconfigured phase shift outputs;
    an emitter component to emit a plurality of modulated signals toward an object during a transmission window according to the plurality of modulation signals;
    a sensor component to detect a plurality of reflected modulation signals from the object during a reflection window; and
    a control component to:
      configure the modulation component to generate a first portion of the plurality of modulation signals using a first preconfigured phase shift output of the threshold number of preconfigured phase shift outputs;
      configure the modulation component to generate a second portion of the plurality of modulation signals using a second preconfigured phase shift output of the threshold number of preconfigured phase shift outputs; and
      instruct the emitter component to emit the plurality of modulated signals during the transmission window to emulate a measurement phase associated with the plurality of modulated signals based on the first portion of the plurality of modulation signals and the second portion of the plurality of modulation signals,
        wherein the measurement phase is different from the first preconfigured phase shift output and the second preconfigured phase shift output; and
      determine a distance to the object based on the measurement phase and a reflected phase associated with the plurality of reflected modulation signals.

12. The imaging system of claim 11, wherein the control component is to:
    determine the reflected phase associated with the plurality of reflected modulation signals based on an average of respective phases of the plurality of reflected modulation signals; and
    determine the distance to the object based on a difference between the measurement phase and the reflected phase.

13. The imaging system of claim 11, wherein the control component is further to:
    cause distance information associated with the determined distance to be displayed on a user interface that is communicatively coupled to the imaging system.

14. The imaging system of claim 11, wherein the control component is further to:

determine that the distance is within a threshold range; and transmit an alert to a system based on determining that the object is within the threshold range.

15. The imaging system of claim 11, wherein the threshold number of preconfigured phase shift outputs comprises at least two preconfigured phase shift outputs and less than five preconfigured phase shift outputs.

16. A method comprising:

determining, by a control component, a measurement phase for a plurality of modulated signals,
   wherein the modulated signals are to be transmitted toward an object during a transmission window to emulate a measurement signal;

identifying, by the control component, preconfigured phase shift outputs for the plurality of modulated signals;

selecting, by the control component, a first preconfigured phase shift output for a first modulated signal of the plurality of modulated signals and a second preconfigured phase shift output for a second modulated signal of the plurality of the modulated signals,
   wherein the first modulated signal is to be transmitted during a first portion of the transmission window and the second modulated signal is to be transmitted during a second portion of the transmission window;

calculating, by the control component, a first duration of the first portion of the transmission window and a second duration of the second portion of the transmission window based on the measurement phase, the first preconfigured phase shift output, and the second preconfigured phase shift output; and causing, by the control component, the first modulated signal to be transmitted for the first duration of the first portion of the transmission window and the second modulated signal to be transmitted for the second duration of the second portion of the transmission window,
   wherein the measurement signal is emulated to have the measurement phase using the first modulated signal for the first duration and the second modulated signal for the second duration.

17. The method of claim 16, wherein at least one segment of the first portion of the transmission window occurs between two segments of the second portion of the transmission window.

18. The method of claim 16, wherein the first portion of the transmission window occurs before the second portion of the transmission window.

19. The method of claim 16, wherein the measurement phase is between the first preconfigured phase shift output and the second preconfigured phase shift output.

20. The method of claim 16, further comprising:

determining a distance to the object based on a plurality of reflected signals from the object,
   wherein the plurality of reflected signals correspond to the plurality of modulated signals reflecting off the object,
   wherein the distance is determined based on a phase shift between the plurality of reflected signals and the plurality of modulated signals.

* * * * *